(Model.) 2 Sheets—Sheet 1.
W. & B. VERITY.
APPARATUS FOR WITHDRAWING OR FORCING AIR FOR VENTILATING AND OTHER PURPOSES.
No. 246,048. Patented Aug. 23, 1881.
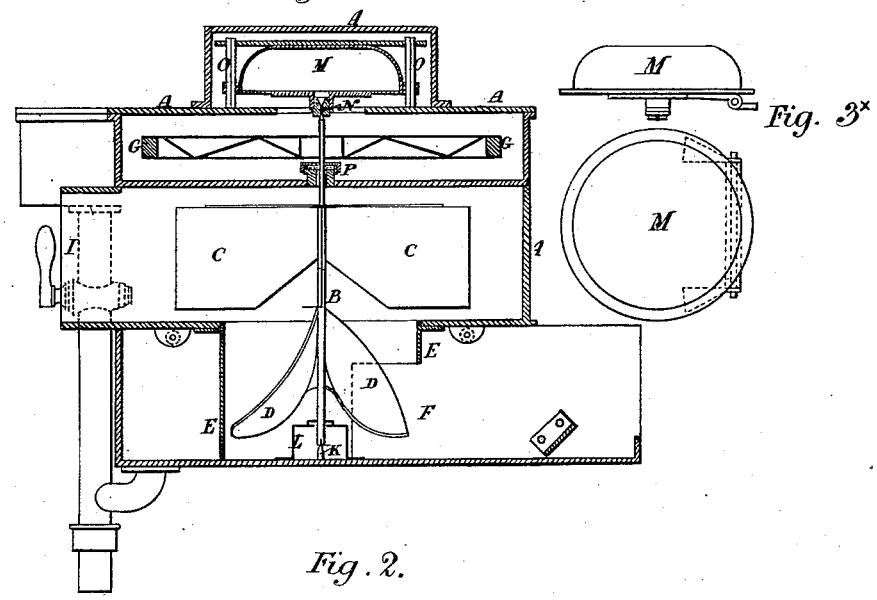
Fig. 1. Fig. 3ˣ
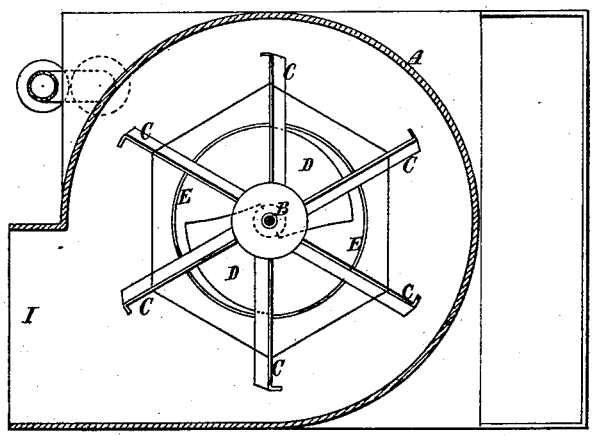
Fig. 2.
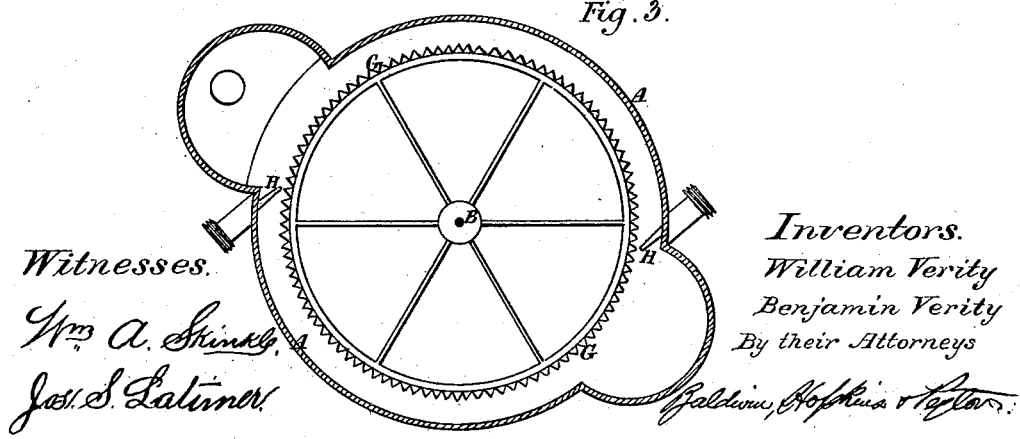
Fig. 3.
Witnesses.
Wm. A. Skinkle
Jas. S. Latimer
Inventors.
William Verity
Benjamin Verity
By their Attorneys
Baldwin, Hopkins & Peyton
N. PETERS, Photo-Lithographer, Washington, D. C.

(Model.)  2 Sheets—Sheet 2.
W. & B. VERITY.
APPARATUS FOR WITHDRAWING OR FORCING AIR FOR VENTILATING AND OTHER PURPOSES.
No. 246,048.  Patented Aug. 23, 1881.
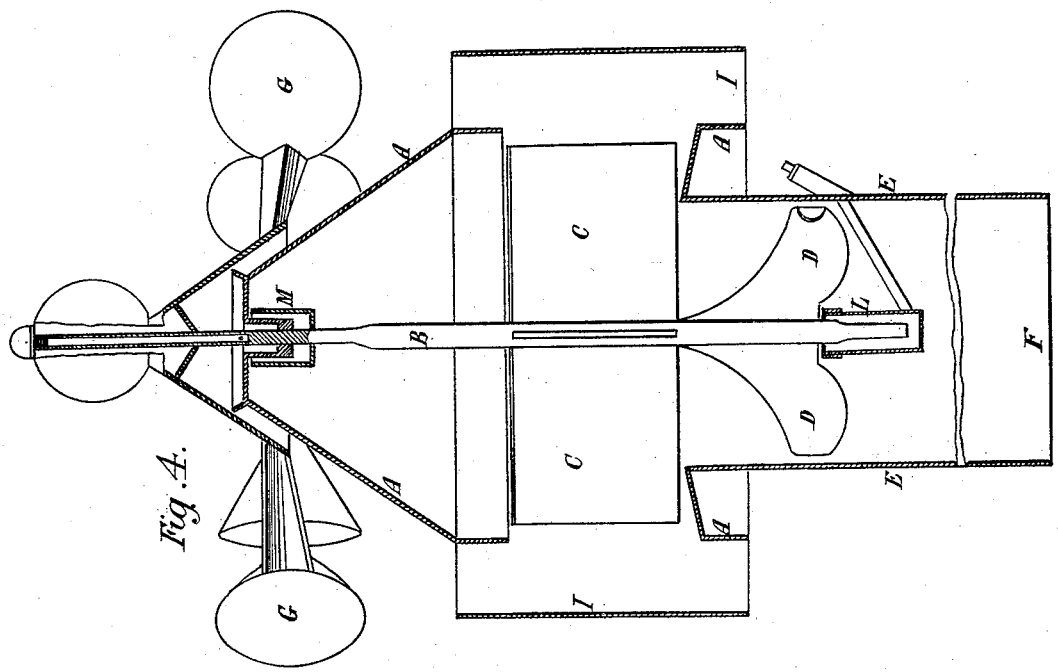
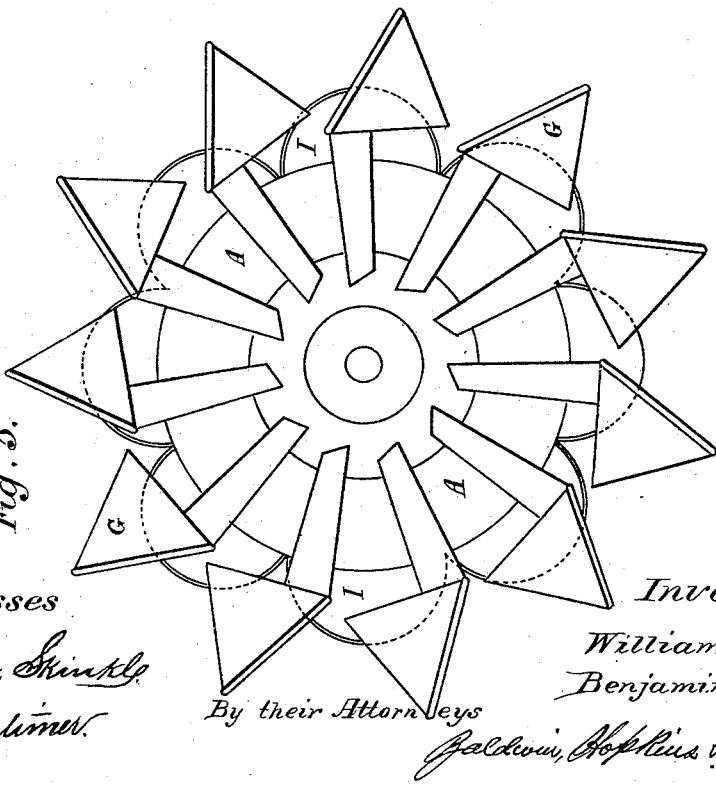
Witnesses  
Wm A. Skinkle  
Jas. S. Latimer
Inventors:  
William Verity  
Benjamin Verity  
By their Attorneys  
Baldwin, Hopkins & Peyton

UNITED STATES PATENT OFFICE.

WILLIAM VERITY AND BENJAMIN VERITY, OF STANHOPE STREET, EUSTON ROAD, COUNTY OF MIDDLESEX, ENGLAND.

APPARATUS FOR WITHDRAWING OR FORCING AIR FOR VENTILATING AND OTHER PURPOSES.

SPECIFICATION forming part of Letters Patent No. 246,048, dated August 23, 1881.

Application filed February 10, 1881. (Model.) Patented in England December 15, 1880.

*To all whom it may concern:*

Be it known that we, WILLIAM VERITY and BENJAMIN VERITY, subjects of the Queen of Great Britain, both of Stanhope Street, Euston Road, in the county of Middlesex, England, have invented certain new and useful Improvements in Apparatus for Withdrawing or Forcing Air for Ventilating and other Purposes, (for which we have received Letters Patent in England, No. 5,266, dated 15th December, 1880,) of which the following is a specification.

At the present time revolving fans are for the most part used for producing currents of air. The fans are formed of an axis having radial blades projecting from it. The blades are inclosed in a circular casing with closed ends, and from which there is a tangential outlet. An inlet is formed at the center of one or both of the ends of the casing for air to enter. When the axis is revolved air is drawn in at this central opening, and is driven outward by the radial blades and forced away through the tangential outlet. We have found that the action of such apparatus can be greatly improved by surrounding the central inlet-opening with a cylinder projecting outward from the end of the casing parallel with the axis, and by securing to the axis or to the fan-blades a screw blade or blades, such screw blade or blades being contained within the cylinder. The cylinder is open at its end, and also, if desired, an opening may be formed on one side of it for air to enter. By this means, when the axis of the fan is revolved by a suitable motor, the screw blade or blades will draw air inward through the cylinder and deliver it into the center of the fan-casing, and will so constantly keep up a supply of air to the center of the fan while the fan-blades force the air outward and away through the tangential outlet. By this means the volume of air delivered by a fan may be greatly increased without the expenditure of more driving-power. An inlet-cylinder and screw-blades may thus be applied at one end only of the cylinder; or a screw and inlet-cylinder might be applied at both ends. The casing of the fan may also be made with numerous outlet-openings instead of with a single outlet only.

In some cases, and especially when the fan is driven by a small jet of water directed against the corrugated circumference of a wheel which is fixed on the fan-axis, we mount the fan-axis in a vertical position, and with the corrugated wheels either above or below the fan and screw-blades. The lower end of the axis is passed down through a loosely-fitting stuffing-box into a closed vessel filled with oil, and a cone-point at the bottom of the vessel enters a corresponding hollow in the end of the axis. The upper end of the axis is pointed, and enters a corresponding recess at the bottom of a closed vessel filled with oil. This oil-vessel is mounted in vertical guides in the frame of the apparatus, so that it can be raised or lowered. A fine hole is made from the bottom of the recess into the oil-vessel, and the oil-vessel is either allowed to rest by its own weight on the top of the spindle or is pressed downward onto it by a spring. In this way, when a minute quantity of oil has passed down through the fine hole and comes between the coned surfaces of the spindle and oil-vessel, the entrance of air into the oil-vessel is closed, and no further oil descends until the oil between the coned surfaces has escaped sufficiently to allow a minute quantity of air again to enter the oil-vessel.

By supporting the axis of the fan in the above manner it can be turned with but little friction, and will run for a great length of time without attention or the addition of any oil for lubrication.

In the drawings hereunto annexed we have shown examples of apparatus in which the above-described improvements are embodied.

Figure 1 shows a vertical section of one form of the apparatus, in which the fan is revolved by means of a small jet or jets of water directed against the periphery of a toothed wheel which is fixed on the fan-axis. Fig. 2 is a horizontal section of the same, taken through the radial fan-blades; and Fig. 3 is a horizontal section taken through the toothed wheel against which the jets of water are caused to impinge.

A is the fixed outer casing. B is the axis, carrying the radial fan-blades C. D D are screw-blades fixed to the axis below the radial blades C. E E is a fixed cylindrical casing surrounding the screw-blades. F is an opening at one side of this casing, through which air can pass to the screw-blades. G is the toothed wheel, against which thin streams of water are directed from the jets H. Water is supplied to these jets from an elevated cistern, or from a water-main. When thin streams of water from the jets H are caused to impinge against the toothed wheel G this wheel is caused to revolve and turns the axis B with it. The screw-blades then force a stream of air upward through the cylindrical casing E into the center of the chamber of the fixed case which surrounds the fan-blades. The air so supplied to the center of the casing is, by the action of the radial fan-blades, forced outward away from the axis, and passes away by the tangential outlet I. The lower end of the axis B rests upon a fixed cone-point, K, at the bottom of an oil-vessel, L. The axis passes down through a hole in the center of the cover of this vessel, and through a hole in a disk of felt carried by the cover. This serves to exclude dust from the oil-vessel without putting any material amount of friction upon the axis. The upper end of the axis B is formed to a cone-point. This enters a corresponding recess in the bottom of an oil-vessel, M. N is a fine hole passing from the interior of the oil-vessel to the cone-recess at its bottom. The oil-vessel M can move up and down on vertical guides O, and rests upon the cone-point on the top of the axis B, and so forms a bearing for the upper end of this axis; or, in place of the oil-vessel being made so that it can move up and down in vertical guides, it might be carried by a long hinge-joint, as shown at Fig. 3×. P is a small stuffing-box, through which the axis B passes, and which serves to shut off communication between the chamber of the casing which surrounds the water-wheel G and the chamber which surrounds the fan.

Figs. 4 and 5 show apparatus similar in its action to that shown at Figs. 1, 2, and 3, except that the fan-axis, in place of being revolved by water-jets acting upon the circumference of a toothed wheel, is revolved by the action of the wind upon a cup-wheel fixed upon the axis. Fig. 4 is a vertical section of the apparatus, and Fig. 5 a plan view.

A is the fixed outer casing. B is the fan-axis. C C are the radial blades of the fan. D D are the screw-blades. E is a fixed cylindrical casing surrounding the screw-blades. The air to be drawn off from any room or part of a building is conducted by a suitable pipe or channel to the lower end, F, of the casing E. G is a cup-wheel on the axis B. This wheel is formed, as shown in the drawings, in a similar manner to the cup-wheels used for measuring the velocity of currents of wind, and revolves whenever a current of wind blows past it.

Whenever the cup-wheel revolves the axis B turns with it, and the screw-blades D force up air to the fan-blades, and the fan-blades force the air outward away from the axis, and it passes away through the numerous outlet-openings I which are formed around the circumference of the outer casing, A, as shown. The lower end of the axis B rests on a point at the bottom of an oil-cup, L, and the upper end is supported in a bearing, which is surrounded by an oil-vessel, M, carried by the axis B, as shown; or it might be supported in other suitable manner. O is an opening on the top of the axis B, closed air-tight by a screw-plug. Whenever the upper bearing of the axis requires a fresh supply of oil for lubrication the screw-plug may be unscrewed and a small quantity of oil poured into it. The oil will run down into the bearing, and will be prevented from escaping from it by the oil-cup M, which is fixed to the axis, and which surrounds the bearing.

By our invention, it should be noticed, the fan-shaft is driven by a suitable motor and the screw-blades caused to force air to the radial fan-blades, which, thus assisted, have imparted to them the capacity of delivering a much greater volume of air in a given time than could be delivered by an apparatus in the working of which the air is acted on by but a single set of blades.

We claim as of our invention—

1. The combination, substantially as hereinbefore set forth, of the fan-shaft, the motor by which it is driven, the fan-blades, and the screw blade or blades, having the capacity of propelling a current of air into the center of the fan and so facilitating the projection of the air outward from the axis of the fan by the action of the fan-blades, as described.

2. The combination of the outer or fixed casing, the axis carrying the radial fan-blades, the screw-blades, also carried by said axis, and the cylindrical casing surrounding said screw-blades, into which cylindrical casing the air is drawn and from which it is forced to the fan-blades by the screw-blades, substantially as and for the purpose hereinbefore set forth.

WILLIAM VERITY.
BENJAMIN VERITY.

Witnesses:
JOHN DEAN,
J. WATT,
Both of 17 Gracechurch Street, London.